(12) United States Patent
Bellaiche et al.

(10) Patent No.: US 7,707,196 B2
(45) Date of Patent: Apr. 27, 2010

(54) SOFTWARE-TYPE PLATFORM DEDICATED TO INTERNET SITE REFERENCING

(75) Inventors: Sylvain Bellaiche, Paris (FR); Cesar Henao, Coye la Foret (FR)

(73) Assignee: Agency Multimedia, Saint Denis (FR)

( * ) Notice: Subject to any disclaimer, the term of this patent is extended or adjusted under 35 U.S.C. 154(b) by 0 days.

(21) Appl. No.: 10/523,754

(22) PCT Filed: Aug. 8, 2003

(86) PCT No.: PCT/FR03/50028

§ 371 (c)(1),
(2), (4) Date: Oct. 7, 2005

(87) PCT Pub. No.: WO2004/017228

PCT Pub. Date: Feb. 26, 2004

(65) Prior Publication Data

US 2006/0122992 A1 Jun. 8, 2006

(30) Foreign Application Priority Data

Aug. 9, 2002 (FR) .................................. 02 10147
Aug. 9, 2002 (FR) .................................. 02 10148

(51) Int. Cl.
G06F 7/00 (2006.01)
G06F 17/30 (2006.01)

(52) U.S. Cl. .................. 707/705; 707/781; 707/805; 709/203; 709/225

(58) Field of Classification Search .............. 707/1–10, 707/100–104.1, 200–206; 709/203, 217, 709/219, 234; 715/700
See application file for complete search history.

(56) References Cited

U.S. PATENT DOCUMENTS 5,905,862 A 5/1999 Hoekstra

| | | | |
|---|---|---|---|
| 2002/0038350 A1* | 3/2002 | Lambert et al. | 709/217 |
| 2002/0083167 A1* | 6/2002 | Costigan et al. | 709/224 |
| 2003/0046389 A1* | 3/2003 | Thieme | 709/224 |

FOREIGN PATENT DOCUMENTS

| | | | |
|---|---|---|---|
| DE | 100 64 315 A | | 7/2002 |
| EP | 1 158 439 A | | 11/2001 |
| EP | 1158439 A1 | * | 11/2001 |
| JP | 2002-319129 A | | 11/2001 |
| WO | WO-00/45307 A | | 8/2000 |
| WO | WO 01/29708 | * | 4/2001 |
| WO | WO-01/29708 A | | 4/2001 |
| WO | WO-01/39015 A | | 5/2001 |
| WO | WO 01/46856 | * | 6/2001 |

OTHER PUBLICATIONS

RFC 2109 (1997).*
Budi Kurniawan, Cross Browser Layers, Part One (2001).*
Xiao-Ling Wang et al., Enhancive index for structured document retrieval, Feb. 24-25, 2002, IEEE, 34-38.*
Chien-Hung Liu et al., Structural testing of Web applications, Oct. 8-11, 2000, IEEE, 84-96.*

* cited by examiner

Primary Examiner—Jean B Fleurantin
(74) Attorney, Agent, or Firm—Fulbright & Jaworski LLP

(57) ABSTRACT

The invention relates to a software-type platform which is dedicated to Internet site referencing, i.e., the indexing of sites using Internet search tools that can be accessed by net-surfers, said platform comprising a database. According to the invention, the platform is characterized in that it comprises a client interface enabling the client or the manager of a referenced site to access the database, a consultant interface enabling a consultant responsible for referencing a site to access the database and means which ensures that different data are supplied to the client or consultant user depending on the interface used to access the platform.

28 Claims, 9 Drawing Sheets

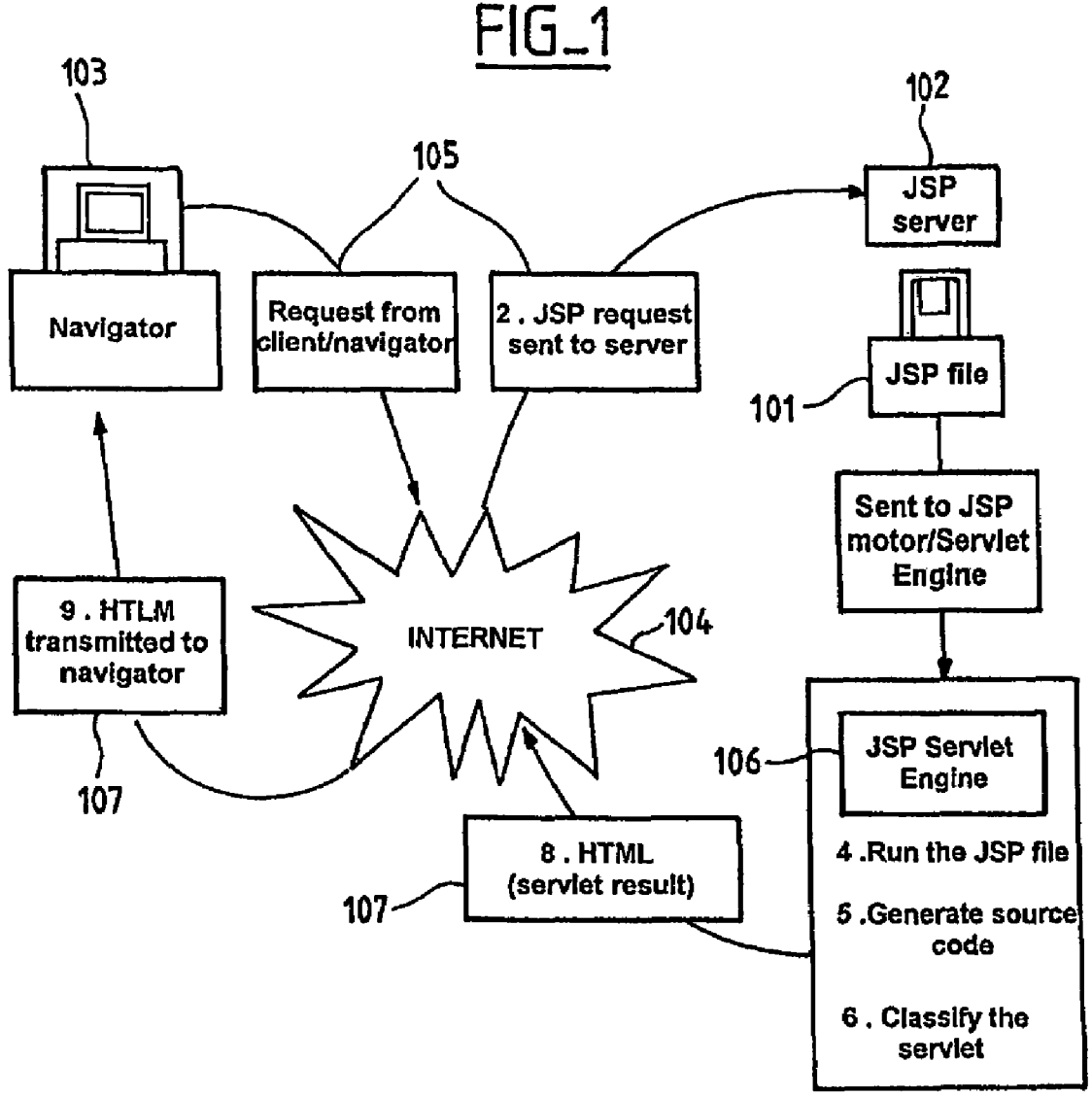
FIG_1

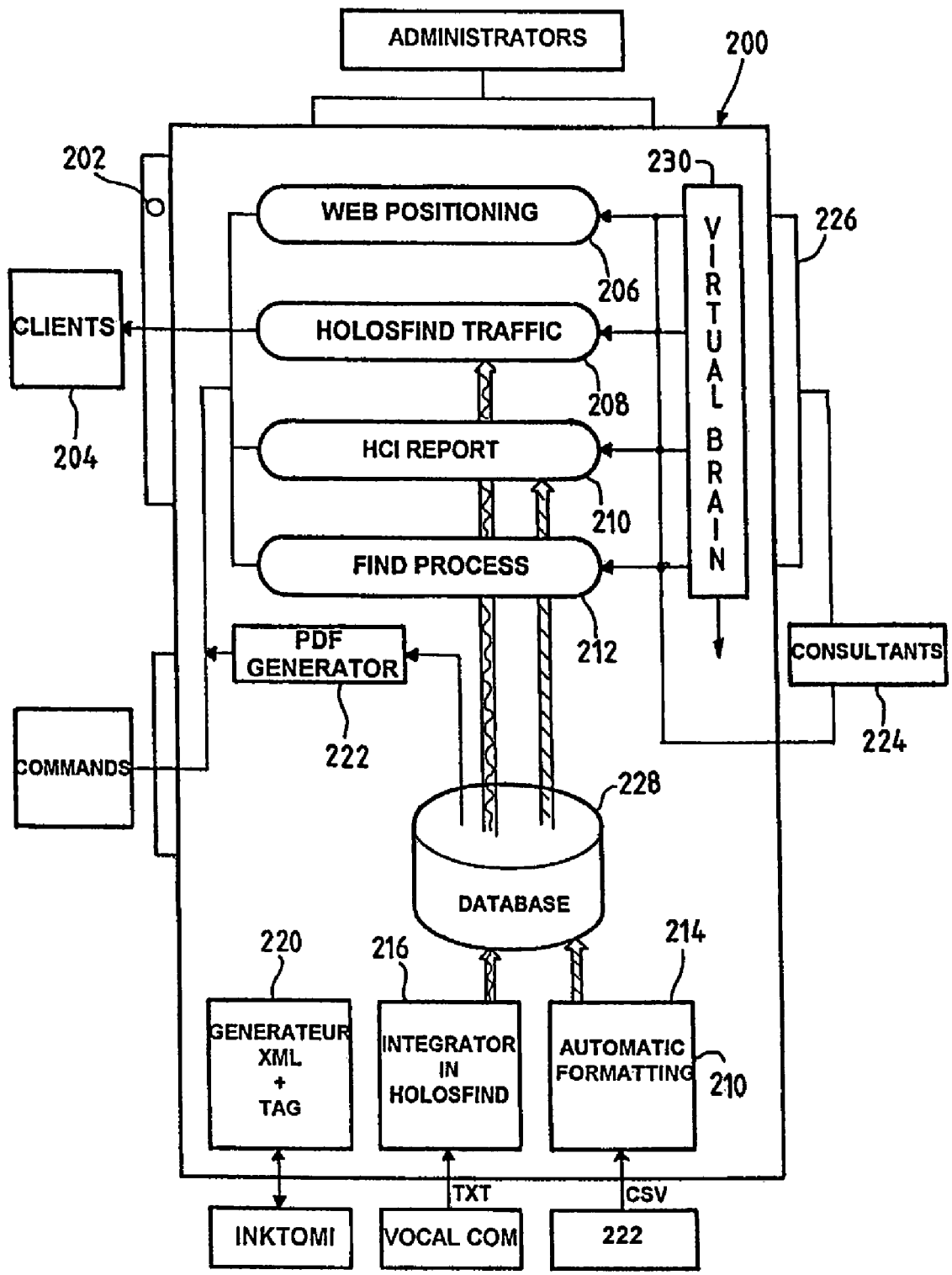

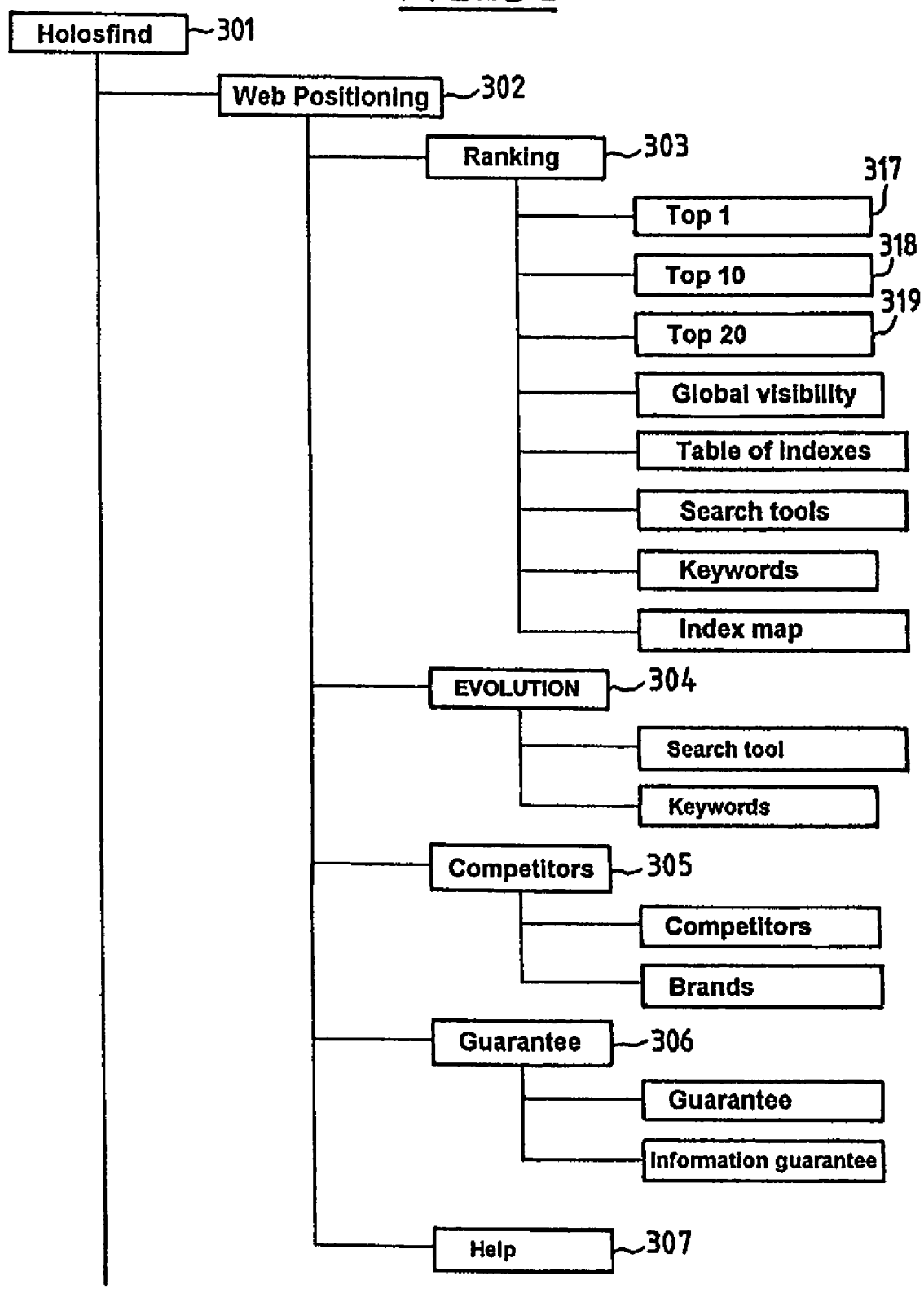
FIG_3a

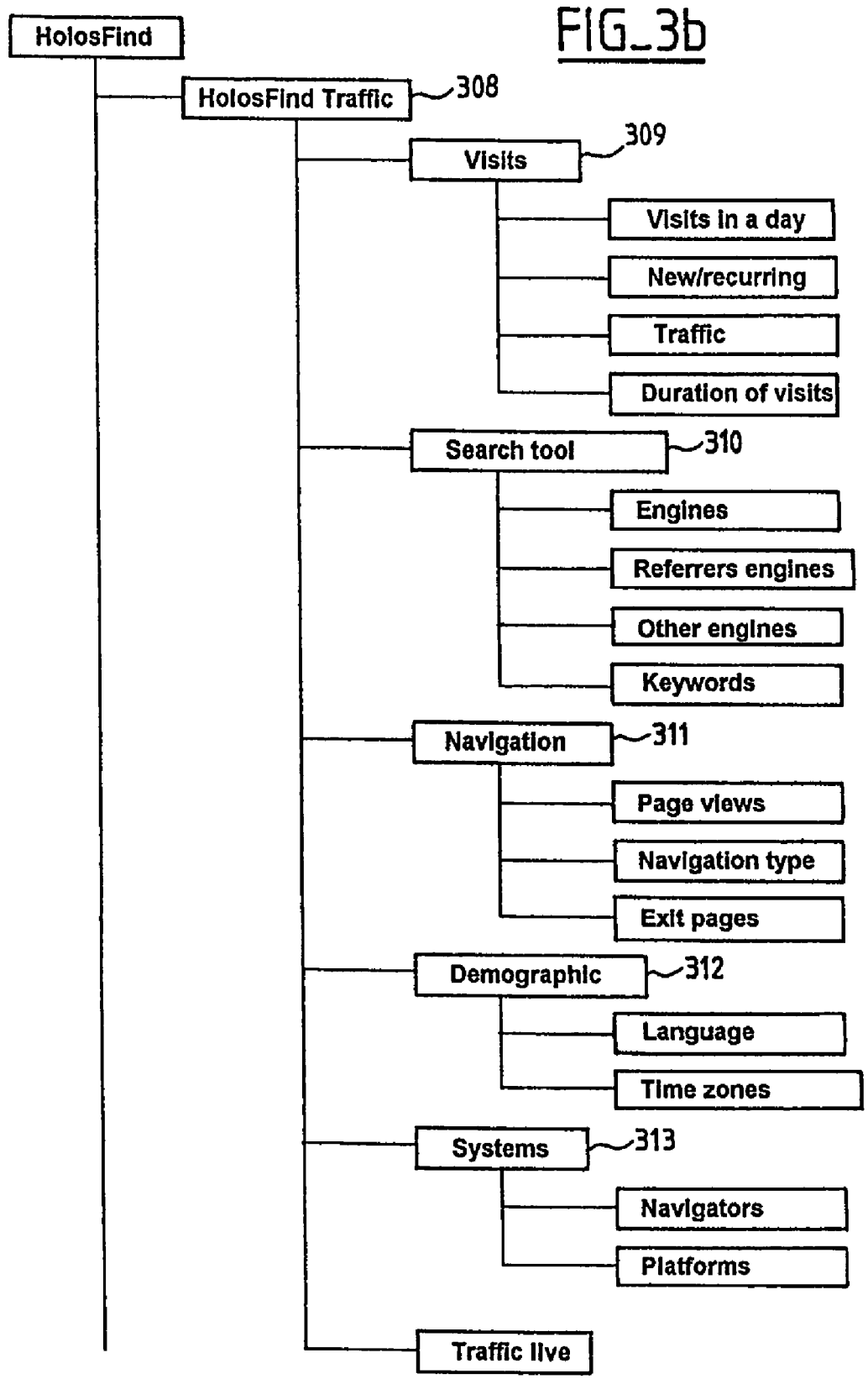
FIG_3b

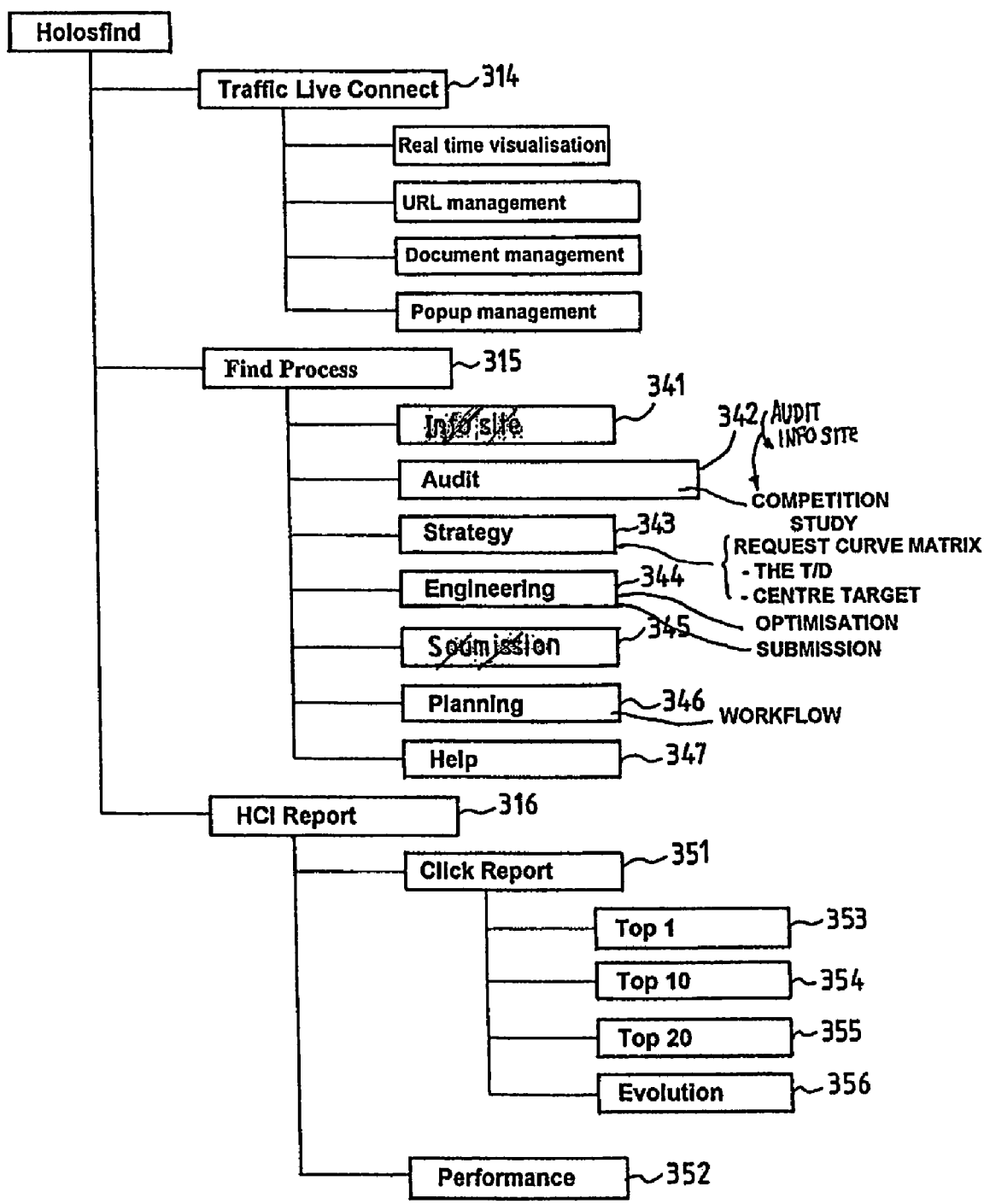
FIG_3c

FIG_4

HOLOSFIND

Your web positioning Instant Access Board ☒

WEB POSITIONING

TOP 1 VISIBILITY                INDEX🔲 HELP? PRINT🖨

POLE POSITION KEYWORDS  01/11/02
- ○ KEY WORDS
- ○ GLOBAL
- ○ BOOLEAN
- ○ SIMPLE

The table shows all the key words placed in first position.

OK

⊕ TOP ONE REPORT TABLE

| SEARCH TOOLS | POSITION | KEYWORD |
|---|---|---|
| Voila | 1 | Monitored referencing |
| Look Smart Direction | 1 | referencing |
| All the Web | 1 | referencing.com |
| Alta Vista | 1 | referencing.com |
| Alta Vista France | 1 | referencing.com |
| ACL Search | 1 | referencing.com |
| Francité | 1 | referencing.com |
| Google | 1 | referencing.com |

WELCOME
WEB POSITIONING
RANKING
- ▫ TOP 1
- ▫ TOP 10
- ▫ TOP 20
- ▫ Global visibility
- ▫ Table of Indexes
- ▫ Search tools
- ▫ Keywords
- ▫ Index map
- ▫ Help

EVOLUTION
COMPETITORS
GUARANTEE
HELP

TRAFFIC REPORT

FIND PROCESS

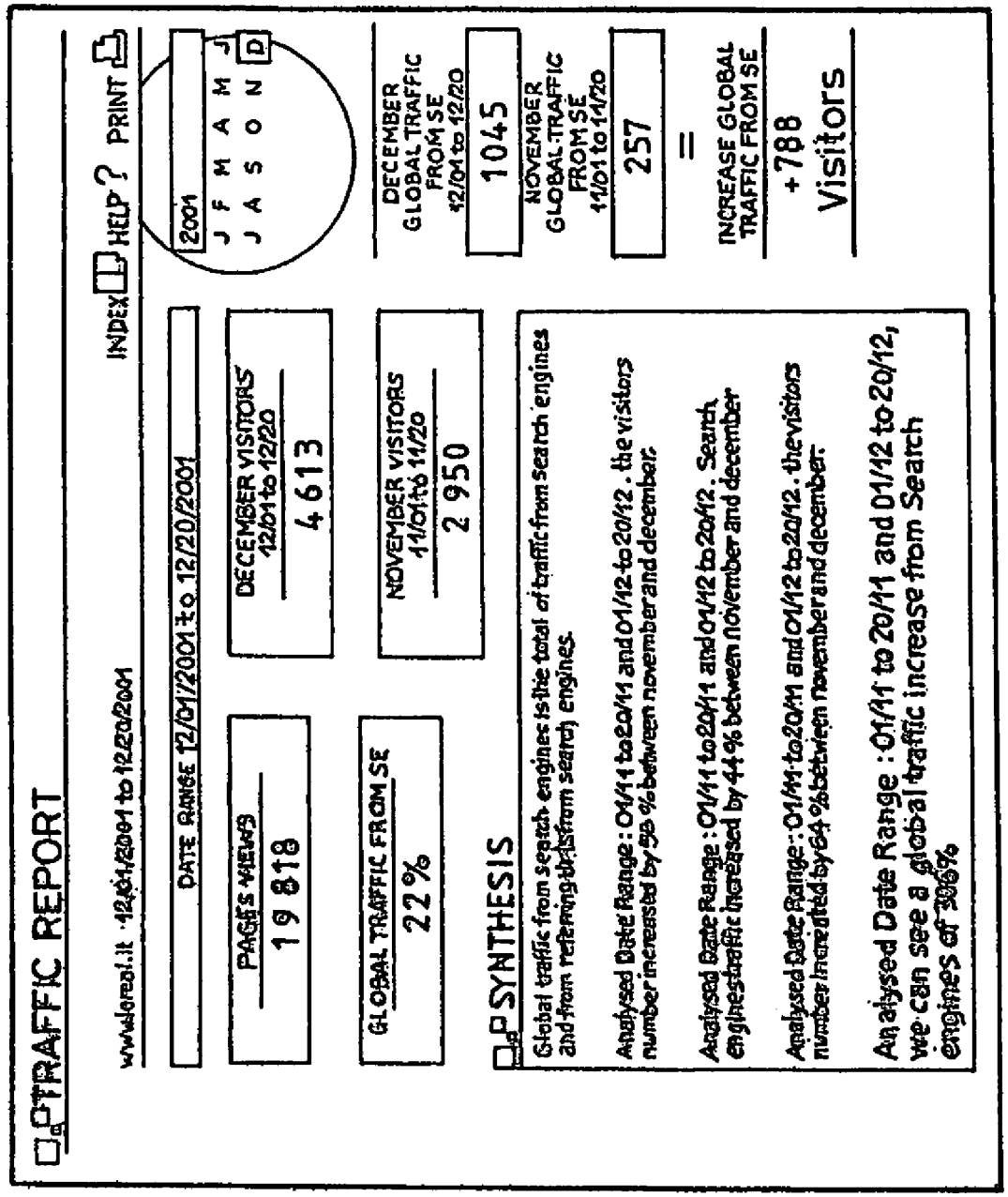
FIG_5

FIG_6

HOLOSFIND
powered by REFERENCEMENT.COM©

Hello, Michael Guez     Thursday, 31-7-2003 12:58:42

Welcome Michael Guez
Holosfind Office Consultant wishes you a pleasant work session 1. First select a service    2. Next filter your files by chart(s)

| | Number of client(s) | Number of files |
|---|---|---|
| | 0 | 0 |

Spontaneous search:

○ HOLOSFIND TECHNOLOGIES PORTFOLIO
○ HOLOSFIND WEB POSITIONING
○ HOLOSFIND TRAFFIC AUDIT
○ HOLOSFIND CONNECT INDEXING
○ HOLOSFIND

3. Select a file

All files in your portfolio 4. continue

5. Consult your portfolios by service

All HOLOSFIND services 6. continue

○ Holosfind Information Access Board

| | Number of client (s) | Number of files |
|---|---|---|
| | 0 | 0 |

Spontaneous search in all services

FIG_7

HOLOSFIND
powered by REFERENCEMENT.COM

Hello, Thursday, 34-7-2003  12:44:50

- ADMINISTRATION CONSOLE V2.0
- HOLOSFIND Administration
  - Creation
    - Clients
    - Files
    - Consultants
    - Optimisers
  - Modification
  - Suppression
    - Client list/files
    - Consultant list
  - HOLOSFIND CHARTS
  - Parameters
- HolosFind Find
- HolosFind Connect Indexing
  - Requests for validation
  - Requests being handled
  - Filed requests
- REPORTING
  - Billing
  - INKTOMI parameters
- Free Referencement

Insertion of a new consultant

Consultant name [23] [____]
Consultant first name [____]
Password [____]
Telephone [____]
Fax: [____]
Email: [____]

[ Add a consultant ]

SOFTWARE-TYPE PLATFORM DEDICATED TO INTERNET SITE REFERENCING

This application is a 371 from PCT/EP2003/050028 filed Aug. 8, 2003, which claims priority from FR 02/10148 filed Aug. 9, 2002 and FR 02/10147 filed Aug. 9, 2002, herein incorporated by reference.

The invention relates to a software-type platform dedicated to referencing Internet sites.

BACKGROUND OF THE INVENTION

An increasing number of entities, such as businesses, associations and/or private individuals, wishing to be present on the Internet to allow users of this network, referred to hereinafter as netsurfers, access to information offered by these entities.

For this it is necessary to have an Internet site, that is, a database, generally in the form of pages coded in Hypertext Mark-up Language (HTML), which is stored in a server connected to the Internet in such a way as to permit the transmission of these data to a netsurfer requesting them.

To permit the realization of such a request, each site of the Internet is identified by an address of its own, called the Unique Response Link (URL).

Thus, a surfer can connect to the server stocking a particular site by giving his navigator the URL of the site he wishes to consult.

However, frequently the address of the site that a netsurfer might desire to consult is unknown to him, especially when such consultation is made for the first time in view of seeking out one or more sites that can answer a request for information.

In this case it is possible to search for the URL by means of search tools called servers or search engines present on the Internet.

For example, companies such as Google, Altavista, Yahoo, Lycos, MSN, Inktomi, Fast or Voila operate such search tools.

These search tools are Internet sites making it possible to order a URL search starting out from one or more key words, such that from this key word or words a search server offers a list, called Web result, of sites and their URLs so that the netsurfer can access one or more sites that appear of interest to him, i.e., having a content pertinent to his search.

Given the extremely great number of sites present on the Internet, the search servers have an important role in the promotion of a site with netsurfers.

For example, when a new site comes on line in the Internet, it is important to reference it, i.e., to assure that this site is indexed in the databases of these search servers, so that netsurfers who have made a search, or request, by key words can be directed to this new site by selecting the URL of this site from the Web result.

In fact, the URLs in the Web result are coded in the form of a hypertext link which permits direct access to the site corresponding to the URL by means of a mouse connected to a computer.

Furthermore, it is advantageous to the responsible party of a site for this link to appear in the first responses from the list proposed by a search server on the occasion of a request when the key words of this request are pertinent to the content of the site.

In fact, it is acknowledged that a netsurfer rarely consults the responses put forward by a search server beyond the $30^{th}$ or even the $20^{th}$ response offered.

In fact, either this netsurfer finds a site matching his expectations in the first responses proposed or he re-establishes the key words he chose in order to resume the search.

This is why a manager, called hereinafter a webmaster, of an Internet site must check and find the referencing of this site in order to promote the frequenting of this site.

For this, this webmaster faces the problem of determining an Internet strategy which, according to the content of the site and the attempts of the netsurfers, makes it possible to set up a list of key words associated with the site, to which the content of the site must correspond and with which the netsurfers' needs can be identified in order that the search tool will guide the netsurfer toward this site via these key words.

Furthermore, the webmaster must make possible modifications to the structure of the site which can enable him to be identified optimally by the research servers because, as will later be described, it is possible that a search server might be unable to reference a site because of problems inherent in the site's structure.

Moreover, since a search tool can index a plurality of sites of similar or competitive content simultaneously, the webmaster is facing the problem of defining a website structure enabling him to figure among the first responses of a list of web results provided by a search tool.

For these operations of optimization to be taken into account by the search tool, it is indispensable that the webmaster subject the new site to the search tools so that the tools will list the site in their databases and provide it among the first responses to any pertinent inquiry.

Also, it is known that, to measure the referencing quality of a site, it is necessary to observe the visibility of this site, i.e., its accessibility by means of the search servers.

The visibility of a site is measured by observing, for a given key word, the appearance or classifying rank of this site in the list of results presented by a search tool.

Such an observation corresponds to measuring a parameter referred to hereinafter as the Index of the Rate of Penetration on the Net (ITPN).

To perform this observation, it is known to use specific software which, according to key words supplied, from a list of search tools selected and of a particular URL, perform operations necessary to obtain the classification of the site in the list of the proposed results.

This Index of the Rate of Penetration on the Internet (ITPN) measures, for each key word used by the site, the exact position which the site in question occupies in the Web results supplied by the various search tools.

In other words, these results indicate, for each search tool and each key word, a rank of appearance of the site observed in the responses proposed by the search tools to the request corresponding to one or more of the key words supplied.

Thus, each result appears in the form of a triplet of data:

(search tool)/(key word)/(rank of appearance of the site in the tools).

For example, a search concerning a site "cosmetic.com" can be performed in relation to 4 search tools named OR1, OR2, OR3 and OR4 and considering the following key words: cosmetiq The results of the search, provided in a data processing format specific to each software used, such as the CSV format, then takes a rough or simple shape such as:

| Search Tool or Key word: OR | cosmetic Classing | maquillage | make-up |
| --- | --- | --- | --- |
| 1 | 2 | 4 | 9 |
| 2 | 1 | 5 | 6 |
| 3 | 1 | 3 | 10 |
| 4 | 17 | 13 | 18 |

By analyzing this table it can be seen that, for example, the URL of the site "cosmetic.com" appears in a less good position with the search tool OR4 ($17^{th}$, $13^{th}$ and $18^{th}$ position for the words 'maquillage' and 'make-up,' respectively, than with another search tool, such as search tool OR1, or for these same search words, the URL of the site appears in $2^{nd}$, $4^{th}$ and $9^{th}$ place.

In like manner, such a table makes it possible that a key word, such as 'cosmetic' or 'maquillage' is better referenced than another key word, such as 'make-up' in this example. ue, maquillage, make-up.

However, these crude or elementary results present the problem of being given without any distinctive form permitting quick comprehension, direct by synthesis of the graded classifications of the site.

As a result, the consultant of a referencing business conducting a study for a client's account is forced to spend time in sorting and organizing the information obtained by the specific software, consequently limiting his availability for performing analyses of the performance of these sites, for example with regard to the keywords most used by the netsurfers.

In fact, the foregoing example concerns three key words and four search tools, whereas one consultant must handle tens of them, even hundreds of key words in connection with tens of search tools.

Furthermore, it should be emphasized that the consultant is also obliged to translate the results provided by a specific software in a specific language, such as CSV (Comma Separated Value, that is to say, values separated by commas) to a more generalized language so as to be able to share the results obtained by means of this software with these clients, this translation presenting the problem of again reducing the time that a consultant can devote to the analysis of the results.

The measure of the quality of the referencing of a site also requires observing the frequentation of this site, i.e., the number of netsurfers accessing this site.

Now, the measurement of frequentation presents the problem that, when a netsurfer has accessed a site via a search server in which this site is referenced, it is common for the netsurfer to enter into the memory of his computer, generally in the form of a "favorite," the URL of the site accessed, in the degree of the importance of this site, thus avoiding another search every time he needs to connect to this site.

In this case, that is to say, when this netsurfer connects to the site in question, via its favorite, it is not possible for him to determine via the search tool that this connection is made by means of the search tool, which proves troublesome in tracking the frequentation of a site.

To this effect it is well to note that the measure of the frequentation of a site is, according to the prior art, performed by means of a specific software called "TAG" hereinafter.

A TAG entered in an Internet page is thus a little script, or program, which is executed each time that the page is read by a netsurfer.

Since then it is possible to involve a counter which increases at each run of the script, that is, at each teleloading of the page by a netsurfer.

To accomplish a frequentation measurement there are some service providers, such as Audientia, XITI, Estat or VocalCom SA, devoted to this operation and presenting their results in form specific to each supplier.

However, as with visibility measuring suppliers, the operations connected with the measurement of frequentation require a great amount of human involvement in order to obtain from rough data the fine data underlying a phenomenon, such as an increase in the frequentation of a site which the consultant wants to place before his client.

If one considers that such a presentation of treated data is generally accompanied by the consultant's commentaries, it appears that this human intervention is time-consuming, because thousands, even millions of pages may have to be considered, as well as many visitors and an extremely great number of key words and sorting words.

In fact, the volumes of data to be dealt with by a consultant for an analysis of visibility and frequentation are so great that they create many problems. The number of clients that can be dealt with simultaneously by a consultant is small, which presents the problem of limiting the performance of a consultant doing these operations.

Furthermore, this amount of information to be processed limits the time that such a consultant can allow for his analysis and therefore to the quality of his advice for situating or maintaining the site in a good position of visibility and frequentation.

Also, the storage of raw information is expensive for it requires a large memory capacity such that this information is not generally stored.

As a corollary, the lack of data storage relative to a site over relatively long periods of time, that is to say several months, prevents analysis of the development of a site in terms of frequentation and/or visibility, for example.

The large volume of raw data to be process also causes access to these data to be generally restricted to the consultant of a firm, who having a certain experience in the treatment of these data is able to identify the important data.

To sum up, it appears problematic that, according to the prior art, the operations proper to referencing are analyzed manually from raw data provided by software programs, as described previously in connection with the visibility of a site.

After that, several days of work are required to conduct the following of the referencing of each site. In fact, considering, for example, the analysis of the visibility of a site, it is necessary for the consultant of a referencing service to handle the presentation of this information so as to facilitate its comprehension and/or its interpretation, for example by means of data displays.

Furthermore, it is well to note that the consultant is generally asked to provide commentaries on these displays so as to help the client to understand the phenomenon observed, which again increases the charge for his work.

Also, this operation brings up the problem that, to produce these displays, a consultant is constrained to use displays whose parameters are limited and predetermined so as to limit the time required for the acquisition of these displays.

Lastly, it should be noted that a consultant generally presents analysis reports in a similar form for different clients, that is, there exists no personalization of the results sent to a client, because this would mean an extra amount of work performed to the detriment of the thorough analysis of the client's Website.

On the other hand, for a site to be referenced in a search engine, it is necessary to wait until this site has been run through by a program of the search tool called a "spider," which runs through the site, reading its content and indexing its pages in the database of the search tool, these pages being associated with the key words.

Now, the spiders of the principal search engines run through the pages of a site only every twenty-eight hours, on average.

On this account, referencing by means of a spider presents the trouble that it can take around twenty-eight days, without its being really possible to cover the time during which the site is not referenced.

These spiders also present the problem that they are unable to read the content and index the pages of only a static Internet site, that is to say, one which is "frozen," while it is not possible for them to reference all of the pages of a dynamic Internet site whose content varies.

For example, if one considers a site permitting access to the content of a dynamic database, i.e., one whose data may very, this site then appears only as a single page whose fields are fed with the content of the database.

Now, this site potentially presents as many pages as entries in the database, while the spider can read only the single physical page, which presents the problem that its analysis will not take into account the real content of the site, i.e., the content of the database.

Furthermore, it is known to put key words, referred to hereinafter as "metas" into the code of the Internet pages, intended to distinguish these pages.

However, the number of key words that can be associated with an Internet page is limited, generally to twenty key words, which does not make it possible to precisely characterize the content of each page, particularly in the case of a dynamic site connected to a database of several hundreds, even thousands, of entries.

SUMMARY AND OBJECTS OF THE INVENTION

The invention permits resolving at least one of the problems mentioned above by putting together a set of capabilities relating to referencing in a unique platform of the software type.

This is why the present invention relates to a platform of the software type devoted to the referencing of sites on the Internet, that is to say, to their indexation by search tools for this Internet which are accessible to netsurfers, this platform including a database characterized in that it includes a client interface permitting access to the database by a client, operator of a referenced site, to a consultant interface permitting access to the database by a consultant responsible for the referencing of a site, and means so that, according to the interface used for accessing the platform, distinct data may be provided to the client or consultant user.

So, by means of the invention, the data relative to the referencing of a site can be shared directly among consultants and clients via their own interfaces, which makes it possible to increase the speed with which this information reaches the client.

Furthermore, by using modules in the client or consultant interfaces, a platform according to the invention permits filtering the crude data of the database to offer the client or consultant refined data corresponding to the service which this client or this consultant wishes to observe, such as a frequentation measuring service and/or a visibility measuring service.

In other words, the platform acts as an analysis tool permitting the transmission to the client and/or the consultant of data filtered through their interface to be discriminative of a sought analysis, thus facilitating the work of the consultant and the reading of these data by the client.

Furthermore, in one embodiment the platform combines a measurement of frequentation of a site with its referencing service in order to identify and follow the performance of sites on the Internet. Thus, it makes it possible to manage the classification of the site in the search tools in the light of the frequentation which this positioning produces.

Such a platform therefore presents an intelligent interface, since it is developing, ergonomic and personalized for each user (e.g., client or consultant), integrating proprietary technologies specifically developed so as to combine the services previously described with services supplied by known technologies, such as software endowed with visibility or frequentation in order to master and control an Internet strategy on a global scale.

The platform, designed by Holosfind, constitutes an innovative technological tool, different applications of which permit making reports, or reporting, on the effects produced by referencing.

Holosfind thus makes it possible to implement an Internet strategy, then, to verify its deployment in order to assure a real advantage for the site, this return on investment applying to each of the functionalities of Holosfind, viz., the various referencing and frequentation campaigns.

Holosfind offers a synthesized representation of all of the results of the positioning of sites on the Web.

One thus benefits from a graphic representation aided by genuine personalized advice. It permits a quick visualization of the fundamentals of the visibility and traffic of sites. Holosfind is in itself an interactive interface between the client and the consultant, since it makes it possible to remain in permanent contact with a consultant devoted to the client.

All this information structured around the Holosfind technology constitutes a basis for decisions regarding webmarketing actions in connection with a campaign for referencing and positioning.

Due to its advanced safeguarding structure, Holosfind can store all the data from the beginning to the end of a job, for working out a precise and transparent report of the data of which it is made up as the first and the most complete in traceability, that is, following up in time the evolution of the visibility and of the traffic, or frequentation, of a site.

Hence, Holosfind is a tool providing help in reaching the decision, making it possible to identify the best opportunities in the matter of web marketing, and particularly in the identification of particularly high-performance key words for referencing a site. For this purpose what is wanted is a management chart that can be outlined for the directors and managers in charge of marketing, communication and the Internet.

Holosfind represents a visionary tool making it possible to anticipate the performance of ongoing campaigns. And of those still to come.

The Holosfind platform heralds maximum transparency and is conducive to a constant improvement of the client-server relationship.

The employment of the technology offers transparency and reactivity: since the analysis and trustworthiness of the pertinent results are manifested on a console, it highlights a pledge of know-how and leads to conscientious conduct.

In one embodiment, this referencing is performed according to a particular method called Holosfind Connecting Indexing, which makes it possible to analyze the content of the clients' Internet sites, both dynamic and static, to translate them to XML language and associate with them an unlimited number of key words.

Once they are set up, the sites are registered, by the platform, not by the search tool, in the databases of the said search tools.

So, due to the platform according to the invention, it is possible to reference a site in a few hours, whereas with a classical referencing according to the prior art, it is necessary to wait for the "spider" to finish, which can take as much as twenty-eight days.

With this method, it is therefore possible to reference all of a dynamic site. The platform furthermore comprises means for "tagging" the referenced sites according to the HCI method, to make it possible to measure frequentation due to the search tools in which the HCI method has been employed. This permits billing for the service according to the results of the said method.

The platform according to the invention therefore includes means for producing automatically, beginning from crude data files, presentation tables and graphics relative particularly to the results of the ITPN of a client.

Thus, the consultant's work is concentrated on analyzing the figures produced by these measures. The invention therefore makes it possible to reduce the time needed to track the visibility of a site from several days to a few hours.

Furthermore, the platform includes means for assisting in the analyses and the writing of commentaries by the consultants. For this purpose it includes a knowledge base, called a "Virtual Brain" hereinafter, fed by the preceding commentaries of these consultants, and associated with a profile of results.

Thus, when this same profile of results is detected, the platform proposes one or more commentaries that are able to correspond to a detected profile.

In this way the consultant has refined data and commentaries on which he can develop an analysis, which enables him to be more effective.

Similarly, the platform can comprise means to aid in the analysis of the measurement of the visibility or frequentation of a site, particularly by cooperating with the known software devoted to operations relating to frequentation or visibility of a site.

Moreover, depending on how it is carried out, the platform of the invention may offer many advantages for:

Personalizing the presentation of the results to a client, for example by means of color and/or displays of specific analyses.

Measuring the performance of the consultants using the base,

Measuring the performance of a site in terms of visibility and/or frequentation, Presenting the results in real time, Integrating into one and the same working platform the results of different software operating under different programming languages in order to generate a document grouping these results under a single presentation easily accessible to the client.

In one embodiment, the platform includes means for analyzing the visibility of the site in all of the Internet network, the visibility of a site being its (or their) rank(s) of appearance or classification of this site in the list of the results proposed by one (or more) tool(s) in response to a key word.

In one embodiment the platform includes means for analyzing the visibility of a site by means of specific or dedicated software which, on the basis of key words supplied from a list of select search tools and a particular URL, carry out the operations necessary for obtaining the classification of a site in the list of the results proposed with respect to suggested search tools.

In one embodiment the platform includes means for automatically shaping visibility data presented in a dedicated data processing format, such as C.S.V. (Comma Separated Value) in a generalized language such as Hypertext Markup Language or in the form of a document image, for example in 'pdf' format to make them easily available to the client or to a consultant via his interface.

According to one embodiment, the platform includes means for inserting images and means for commenting on the data presented, at the consultant interface, these images and these commentaries being transmitted to the client via the client interface.

In one embodiment the platform includes means for modifying the presentation of results via the client interface, particularly in the form of displays and/or graphics, and means for selecting as key words exact expressions (key words with quotation marks), parts of an expression (key words without quotation marks), or combining the two.

According to one embodiment, the platform includes means so that the consultant interface will carry, within the visibility module, at least one of the following modules:

A "ranking" submodule permitting selection of data relating to the classification of a URL in relation to search engines, An "evolution" submodule permitting the filtration of crude data to furnish data related to the development of the visibility of a site in different periods of time so as to identify variations of visibility, A "competitors" submodule making it possible to present, at the client's request, visibility studies relating to sites competing with his site, A "warranty" submodule permitting the filtration of the crude data relative to the client to supply data relating to the nature of the service requested by the client, and A "help" module providing information regarding the use of the platform in order to understand its operation.

In one embodiment the platform comprises means for referencing a site in a quasi-immediate manner by recording this site in the database of a research tool.

According to one embodiment the platform comprises means for reading the content of a client's Internet site, coded in HTML, to translate it into XML format and record it in XML in the database of a research tool.

In one embodiment, the platform comprises means for translating an Internet site into XML language in the following stages:

a) Reading the content of the site, particularly its dynamic content, b) Generation of URL addresses for all the pages of the site. For this purpose it is well to note that these URLs are generated for any type of page, including dynamic pages.

c) Association of a title, of key words, a description, a detailed description, and a TAG with each URL created.

d) Generation of an XML document grouping together all this information, e) Integration of an anti-spam filter, i.e., a document intended to deceive the search tool, to adapt the XML document to the search tools, and f) Direct submission of all the data formatted in XML language for reading by the "spider" of each search tool concerned, in order to permit it to perform a faithful indexation of all the data contained in the document to be published in the lists of the search results.

According to one embodiment, the platform comprises means so that the TAG generated by the platform and inserted into the XML document permits counting accesses to the site via the search tool in which it is referenced.

In one embodiment the platform comprises means so that the client interface shows the number of accesses detected by the TAG in real time, for example in "click report" or "performance" report submodules, as well as means for consulting an index of the principal technical words employed.

According to one embodiment, the platform comprises means for selecting a time period, for example a week or a month, to which the results presented in terms of access relate.

In one embodiment, the platform comprises means for accessing an ensemble of analyses relating to the consultations or visits of a site, such as the number of visits in a day, the number of new visitors, the duration of these visits.

According to one embodiment, the platform comprises means so that the client can consult, via the client interface, the list of search engines considered, the number of visits which each engine generates, and the list of key words considered.

In one embodiment, the platform includes means enabling the client to have access through the client interface to the pages consulted by the netsurfers and/or to a recapitulation of the navigation type of these netsurfers on his website.

According to one embodiment, the platform includes means to enable the client to see, via his interface, an analysis of the languages in which the consultations of his website have been made, as well as the distribution, in terms of his time belt, of these consultations during a day.

In one embodiment, the platform comprises means so that the client can consult, via his interface, technical information relating to the navigators and/or to the platforms used by the clients for consulting his website, enabling him to improve or adapt his site to these navigators.

In one embodiment the platform comprises a complete identification system of a websurfer accessing a site, in real time, making it possible, for example to know the data relating to the host from which he makes his consultation, to know on what page he is in a site, and the duration of his consultation, the headings or products which he is engaged in consulting, and/or to get in touch directly with this websurfer via a system, such as a chat, i.e., a window of communication in real time so as to exchange information in text mode and/or to send him files in a different format (text, sound or video) during the online chat or dialog.

In one embodiment, the platform comprises means to enable the client to follow the progress of the work done by the consultant in relation to a predetermined plan.

In one embodiment, the platform comprises means for offering the following services to a client through its interface:

a) The consulting of information concerning the client's Internet site, and the consultation of referencing and positioning information relating to the site or sites of competitors.

b) The consulting of strategic orientations jointly decided upon by the client and the consultant.

c) Consultation on the title and description of a site, carried out by a consultant, appearing in the search engines as well as the pertinent key words to which the site seeks to respond.

d) The transmission to the client via the platform, of pages optimized for a site by a consultant.

e) The submission to a client site, directly into the windows of submission provided for this purpose by each search engine.

In one embodiment the platform includes means to enable the consultant to select, via an interface, different types of postings, charts, personalized for example with the distinctive colors of a client.

In one embodiment the platform comprises means enabling the consultant to access all of the services provided by the platform to a client, as well as to additional services such as the name of the client site, its URL, the client's login enabling him to connect to the platform, his password, the current phase of the referencing process, as well as an indicator of delay in this phase.

In one embodiment the platform comprises means enabling the consultant to have access to a specific "Holosfindoperator" which permits a client, such as a telecommunication network, to have functions, restricted and adapted to his bylaws, to consult a field of client sites belonging to him and which are treated with white marks by the referent company.

In one embodiment the platform comprises means to enable the consultant to trace from statistics on the results of each site to the operator and to his clients, and inform the operator of statistics about the distribution of his products in his inventory.

In one embodiment the platform comprises an administrator interface making it possible to create, modify and eliminate users from the platform (client, consultant, optimizer) as well as files managed by the consultant.

In one embodiment the platform comprises a system, called "virtual brain," making it possible to provide, on the basis of results on the visibility or frequentation of a site, one or more commentaries which can serve as a basis for the consultant's reflection, these commentaries being determined by comparing these results with the results recorded in a database and associated with commentaries.

In one embodiment the platform comprises means for generating pages of the platform accessible to a client on the basis of data coded in the JAVA® programming language. JAVA is a registered trademark of Sun Microsystems. Inc.

In one embodiment the platform comprises means for printing the pages being consulted, providing help or an index of the principal technical terms employed as well as access to the documents by downloading.

In one embodiment the platform comprises means for restricting access by a client to only those modules for which this client has signed up for the service associated with the consultant.

BRIEF DESCRIPTION OF THE FIGURES

Other features and advantages of the invention will appear in the description given below, by way of illustration and not restrictive, with reference to the drawings attached hereto, wherein:

FIG. 1 is a diagram representing a process for the generation of pages employed by a platform according to one embodiment of the invention.

FIG. 2 is a functional representation of the structure of a platform according to one embodiment of the invention.

FIGS. 3a, 3b, 3c represent the hierarchical organization of the functions of a platform accessible to a client according to an embodiment of the invention.

FIGS. 4 and 5 are examples of the appearance of analysis pages relating to the referencing furnished by the client interface, and FIG. 6 is an example of the presentation of a page of analysis relating to the referencing provided by the consultant interface; and FIG. 7 is an example of the presentation of a page of analysis provided by the administrator interface.

DESCRIPTION OF A PREFERRED EMBODIMENT OF THE INVENTION

In this preferred embodiment of the invention the different pages 101 (FIG. 1) of the platform that are accessible to a client 102 are generated on the basis of data coded in the Java programming language, which makes it possible to generate these pages with reliability as described hereinbelow with the aid of FIG. 1.

The pages 101, called Java Server Pages (JSP®) hereinafter are stored in a server such that their generation is carried out by this server 102 containing the platform and not on the computer 103 of the user remotely accessing the pages of the platform. JSP® is a registered trademark of Sun Microsystems, Inc.

The user thus connects to the platform via the Internet 104, by sending the server 102 a request 105 for a page.

The "JSP servlet engine" 106, situated on the server 102, then executes the Java code contained in the file JSP 101 to generate the code HTML 107 sent to the user's navigator via the Internet 104.

The server 102 represented in FIG. 1 uses the Apache application in this embodiment. In fact, Apache is a server having few known security faults. In fact, as soon as a bug or security lapse is detected it is quickly corrected and a new version of the application is published.

Apache furthermore has many functionalities including the possibility of defining a configuration specific to each file or shared reference, as well as defining restrictions of access by means of an Apache configuration file thanks to "httpd.conf," files, that is to say an Apache configuration file making it possible to define rules in a directory and in all of its sub-directories.

So it can be used to protect a directory with a password, to change the name or the extension of the page used as index or also to block access to the directory.

It would be good here to describe the technological choice of data processing languages used in this platform design.

The Common Gateway Interface (CGI) was one of the first server-side practical technologies for the dynamic creation of HTML pages. The Web servers implementing CGI act as a bridge between the user's request and the data requested. To do this the server first creates a new process in which the program is executed.

It then loads the necessary execution environment as well as the program itself. Lastly, it transmits an object request and calls up the program. At the end of tie program the Web server reads the response from the standard outlet.

The major problem with CGI programming is that it is not at all reactive. Each time a Web request is received by the Web server, a whole new process is created. The creation of a process for each of the requests takes time and important server resources, which limits the number of requests that a server can handle concurrently.

ASP (Active Server Pages) is a Microsoft script language enabling the development of dynamic and interactive Web server applications. It is a script language interpreted on the server side, not on the client side like Java scripts or applets which execute them in the navigator of the site visitors.

Thus, the Active Server Pages are entered in a 3-tier architecture, which signifies that a server supporting the Active Server Pages can serve as an intermediary between the client's navigator and a database, permitting transparent access to the latter thanks to ADO (ACTIVEX® Data Object) technology which supplies the means necessary for the connection to the database management systems and to the handling of the data by means of the SQL language. ACTIVEX® is a registered trademark of Microsoft Corporation.

The basic problem with ASP is that this technology is proprietary; it can be used only with a MICROSOFT® Web server (IIS, PWS) and with a MICROSOFT® operating system (Win9x, WinNT). There are crossovers to other platforms and Web servers, but their engagement detracts from their interest. MICROSOFT® is a registered trademark of Microsoft Corporation.

The third technology for the creation and management of the dynamic content is PHP (Personal Home Pages). PHP is similar in operation to ASP: sections of script are enframed by special markers and incorporated into an HTML page. These scripts are executed at the server before the page is sent to the navigator.

PHP uses C syntax and provides an effective and simple support for the control of types and access to the database.

It also has extensions enabling it to communicate with other resources such as electronic messaging and the directories. Unlike ASP, PHP is, however, independent of the platform and exists for the different versions of Windows, Unix and Linux. The deciding factor is that it is free and therefore "open-source."

Although it has more advantages with regard to the above language, PHP now has problems: it does not have a debugger to facilitate the search for errors at the time of execution. Furthermore, PHP has gaps in regard to the handling of types of data.

Java Server Pages (JSP) are technologies at the server end, using toe object-oriented language Java. The JSP's operate at the same level as the CGI and the server-side script languages such as ASP OR ELSE php. They therefore permit handling requests and supplying a client with a dynamic HTTP request.

JSP's have many advantages over other server-side technologies. First of all, since this is a sturdy and effective Java technology, JSP's work on any platform, all the more because they are independent of the Web server.

Another main trump card of JSP's is re-use, which makes it possible to create components encapsulating services thanks to Java Beans and EJB (Enterprise Java Beans), so as to be able to reuse them in future applications.

The JSP code is executed in an application server, also called a JSP motor. The JSP motor runs through the JSP code and generates a corresponding servlet unless one already exists. It then invokes the servlet and sends the content obtained to the Web navigator.

The programmer thus needs not fret about technical details such as reconnection to the net, the setting up of the response to the HTTP standard, etc.

Lastly, the JSP's can use all the Java API's in order to communicate with outside applications, connect to databases, access input-outputs etc.

An application server is a server inserted between a Web server (to which the clients are connected) and the firm's information system. So the application server dynamically generates Web pages for the users connected from heterogenous information collected in the firm's databases.

The role of the application server is to handle all of the client's interconnection tasks, such as the distribution of the charge among a plurality of servers and the management of connections to the databases.

The technologies most often used by application servers are based on "Enterprise Java Beans."

Lastly, the great strength of application servers is in proposing a development environment in order to automate and generate code skeletons making it possible to implement predefined objects.

Among the most widespread application servers we find JRun, Tomcat and Resin.

JRun, published by Allaire, is a complete Java application server. It takes charge of the most recent standards of the industry for the development of applications made up of Java, JSP, Beans, Enterprise Java Beans, or applications of static content such as HTML pages and other resources.

Its open design has enabled it to operate with a great number of existing Web servers, particularly Apache, Microsoft Information Server (or IIS), Microsoft Personal Web Server (PWS) and Netscape. With JRun it is possible to deploy Web sites associated with a dynamically generated content on nearly all platforms (Windows 9x/NT/200, UNIX, Solaris and Linux).

Tomcat, of the Sun company, is a JSP/Servlet engine of the Apache foundation, used in the execution of the Java servlet and the JSP technologies. Tomcat turns on a very large number of different operating systems, it is very well integrated with the Apache server (but also with others such as IIS), and it is available free of charge. It follows from these features that it is very easy to get literature on this servlet engine. Furthermore, it is not necessary to demonstrate the efficacity of the Apache Web server with which it is generally associated.

Resin, of the Caucho company, has a great many advantages: it supports the main Web servers on the market (iPlanet, IIS, Apache) and has important tools such as XSL and XML support for managing model documents and even supports Version 2.3 of API of the servlets (which is only in the proposal stage). However, its use pays if it fits into a business framework.

A Web server is software permitting clients to access Web pages from a navigator installed on their remote computer.

A Web server is thus a simple software capable of interpreting HTTP requests arriving at the port associated with the HTTP protocol (port 80 by default), and or providing a response with this same protocol. The main Web servers on the market are PWS, ITS, Apache and Netscape Enterprise.

PWS is a Web server strongly connected to Microsoft technology. PWS can be employed under Windows 95 or Windows NT 4.0. The PWS software can be used in two different ways.

It can serve to host a very low-traffic site (to share documents on the Intranet of a business, for example). It can likewise serve to test a site before transferring its content to the Internet Information Server. PWS does not allow handling more than a limited number of simultaneous connections.

IIS is a Web server centered on Microsoft technology. Contrary to PWS, IIS can take charge of several simultaneous connections. Some of the largest Internet Web sites resort to IIS. IIS cannot be used under Windows 95 or 98, but only under Windows NT Server or Windows 2000 Server. It is included with both these operating system.

The server of Netscape Enterprise, for UNIX and Windows NT is very advantageous for Extranet designers because it permits encrypted transmissions, since it allows users to serve different Web servers using the same server on the same machine.

The Netscape server likewise has a relatively safe certification system. It is furnished with a search tool and has direct connections with some database protocols.

However, Netscape Enterprise does not furnish the source code for the server, which limits us in the choice of our level of personalization. This server is today one of the most expensive on the market.

Apache is the fruit of a great number of software corrections for the purpose of making it a very safe solution. In fact, Apache is considered as having few known faults.

So, as soon as a bug or security lapse is detected, it is quickly corrected and a new version of the application is published.

Apache now has many functionalities including the possibility of defining a configuration specific to each file or shared directory, and of defining restrictions of access by means of httpd.conf files.

The file httpd.conf is an Apache configuration file making it possible to set rules in a directory and in all its sub-directories. It can be used to protect a directory with a password, to change the name or the extension of the index page, or also to prevent access to the directory.

The present-day data processing environments within businesses are complex and need an open, high-performance and expandable relational database management system (SGBDR).

This system must be capable of operation on different platforms, must be easily expanded according to needs, support strategic transactional applications and be equipped with open interfaces authorizing integrations.

This choice permits bypassing the problems of the file system and to profit by a number of advantages:

Integrity: We are able to specify rules to be respected by the data. A database management system (SGBD) can control the amount of its data further ahead of and beyond the means offered by the application programs.

Security: The data can be protected against unauthorized reading and writing access.

Recovery from crashes: The database is protected against material faults, disk crashes and some user errors.

Sharing among applications: Multiple application programs are able to access and manipulate data in the same database. A database is a neutral medium that facilitates communication among isolated programs.

Extensibility: Some data can be added and reorganized to increase speed.

Data distribution: The database can be a partition created at various sites, at different enterprises and different material platforms.

Support of transactions is already programmed by the designers.

The middleware is based on client-server communication techniques; it provides the connections between the data servers and the development tools at the client stations. This layer of software conceals the networks and associated communication mechanisms. It safeguards collaboration between client and server.

The middleware, in terms of architecture, is defined as being an ensemble of software services built on top of a transport protocol so as to permit the exchange of requests and associated responses between the client and the server in a transparent manner. It thus makes it possible to mask the heterogeneity of the components involved.

Transparency to the networks: all the networks must be supported (LAN, WAN, etc.). The mediator intervenes on top of the carrier layer of the OSI model.

This can be of the TCP/IP or other type; it can permit the setting up of sessions and the exchange of messages through the session layer or else by the sending of isolated datagrams.

Transparency to the server: The middleware must be capable of concealing the diversity of the SQL dialects which are often different, and of making the languages uniform by basing itself on standards.

Transparency to the languages: The middleware must permit the integration of the functions of connections to the servers, the sending and reception of the results in any language of development used at the client's end.

The best known data middlewares are: Object Linking and Embedding Database (OLEDB), ActiveX Data Object (ADO), Open Database Connectivity (ODBC) and Java Database Connectivity (JDBC).

OLEDB is a group of interfaces which access the data with any type of data and from several sources of data using the OLE Component Object Model (COM). In fact, OLEDB permits access to the relational and non-relational data, as for example the XML files, the Microsoft Office documents and the mails.

OLEDB allows access to the relational or hierarchical data, persistent or volatile, based on SQL or on another request language. In spite of the functionalities which it offers, OLEDB technology has faults:

Immature and unstable technology;

Not based on a standard;

Microsoft's proprietary technology, not available on UNIX.

ADO is an extension of OLEDB, not a different access strategy. It can access a pilot ODBC through the OLEDB-ODBC bridge and greatly simplifies the development, but indeed the problem of portability to non-WIN32 platforms remains persistent.

ODBC is a software layer for allowing an application transparent access to a database. The use of an ODBC architecture proved practical when we have several different SGBD's which we want to access in a way made uniform.

In fact, ODBC technology permits an application to be interfaced in a standard manner to any database server, if the latter only has an ODBC driver.

ODBC is also the standard most supported by the operating systems for access to the data. It is based on the specifications of the SAG CLI and ANSI/92 SQL6. The drivers on the client's end are available on Windows, Unix and Macintosh and other environments.

JDBC is a Java API (group of classes and interfaces defined by SUN and actors of the database domain) permitting interaction with the relational databases with the aid of Java via SQL requests. This API makes it possible to reach SGBD's (MySQL, Sybase, Oracle, Informix, etc.) in a quasi-transparent manner.

The group of classes which implement the interfaces specified by JDBC for a particular database manager is called a pilot JDBC. The protocols of access to the databases are proprietary, so there are several drivers for reaching different databases.

These drivers, of four types, can be written entirely in Java and therefore they can be remotely loaded, or else they can be implemented by using native methods to accede to the libraries providing access to the existing data.

In a client-server system, access to the databases with JDBC can be carried on according to a two-layer model, or else a three-layer model.

JDBC offers several advantages:

Complete API for dynamic SQL;

Many conversion functions;

Multiple pilots: 2-tier, 3-tier conversions, etc.

However, JDBC has deficiencies:

No type verification with respect to the database;

The results are not Java objects.

In view of these elements, it appears that, to select the appropriate language for developing the platform, a number of criteria must be considered:

Security: Security consists in keeping sensitive information in the hands of authorized users.

Performance and Power: The performance and the power of a language depend on its compiler and its cycle of execution.

Portability: The portability of a language depends on the platform that supports it.

Functionality richness: The number of functions which a language can perform.

Simplicity of development: The ease of development offered by a language.

Support cost: Support is the majority of the free time.

Memory consumption: Allowing the space it uses during execution.

Re-use: This is the fact that a program that is run can be used by another program without being obliged to program it again (like the Java applets).

To outline the classification of languages on the basis of these criteria, the following coefficients have been attributed to them:

| RATINGS | COEFFICIENTS |
| --- | --- |
| High | 1 |
| Good | 0.5 |
| Fair | 0.33 |
| Weak | 0.25 |

In the light of the information presented in the state of the art and the rating per criterion of choice found in the comparative study, JSP technology proves to be the most adequate. In what follows the choice of the different tools connected with this technology is justified.

The choice of a server depends essentially, aside from performances regarding the service of content other than that of Servlets, on two criteria: the version of the supported API Servlet and the version of the JSP's.

In fact, the more recent are the API Servlet versions and the supported JSP's, the more we will be able to benefit from their useful functionalities.

Here the operating system selected does not count in the selection of the Servlet engine because, since this type of server is (generally) programmed entirely in Java, any operating system providing an implementation of the virtual Java engine is considered to work.

Our choice is the application server, JRun. This is an important choice since it is today the most widely used in the professional world.

Since we have chosen to couple JRun to a Web server, we will have to pay attention to the Web servers supported. The PWS and IIS servers are not a good choice for they are strongly tied to only Microsoft technology.

Among the most widely used Web servers, Apache software is presently the HTTP server most widely used on the Internet. Provided with numerous functionalities, a good performer and free, Apache then constitutes a very interesting choice for our application.

MySQL is a Database Management System (SGBD) operating under Windows and Linux. This system is one in which it is possible to store data in a structured manner and with the least possible redundancy. MySQL also makes it possible to provide multiple simultaneous connections.

However, MySQL does not provide integrity of the data and therefore it does not assure the safeguarding and restoration of the data, which then makes the processing of data less trustworthy, on the one hand, and on the other hand it accelerates the processing of the data.

The choice of MySQL is based mainly on the speed with which it manipulates data and its tolerance for multiple simultaneous connections. We can then say that this choice contributes fully to the optimization of the site.

Since we have chosen the JSP technology, the middleware to be used must necessarily support JAVA language. The JDBC middleware would then be the most adequate since it adapts well to JSP technology.

In the embodiment described here, the platform offers different interfaces accessible by different users. Particularly, the platform includes a client interface, otherwise called "front office," enabling a client to consult the data furnished by the platform, while a consultant interface enables a consultant to process, update or consult data stored in the platform, particularly the data to which his client has access.

As will be described further on, access to the platform through the various interfaces is under security, this secured access including for example means for the user to avail himself of a log-in and an associated password so that the platform can verify that the password matches the log-in.

Furthermore, in accord with this last log-in, the platform directs a user to access to the corresponding interface.

Representation of a Platform According to the Invention

FIG. 2 schematically represents the platform 200 according to a preferred embodiment described below.

According to the invention, this platform has a client interface 202 enabling a client 204 to access four services of the platform, hereinafter called modules, viz.:

A first "Webpositioning" module 206, intended to show results relating to the visibility of a site,
A second module 208 "HolosFind Traffic" for evaluating the frequentation of a site.
A third "Find Process" module 210 for tracking the progress or schedule of the work.
A fourth "HCI Report" module 212 for indexing clients' web pages.

These different modules are accessible via client interface 202 with a welcome page comprising means for the selection of a client's Internet site being referenced, particularly if the client 204 has several of them.

After this selection, the client 204 accesses a second welcome page enabling access to the modules referred to above, and described later on, the data presented in each module being relative to a client site selected in the preceding step.

In this embodiment, the platform 200 comprises means for permitting access by a client only to the modules which this client has signed up for with the referencer, the other modules being masked.

Webpositioning Module 206:

The "webpositioning" module is dedicated to the analysis of the visibility of the client's Internet site. In other words, this module permits presentation of the results of an ITPN measurement.

For this, the data presented are regrouped in a file in the CSV (comma-separated value, i.e., values separated by commas) which can be accessed by a consultant hired by the client.

Furthermore, the platform includes means 214 for automatically putting the data present into this file, and particularly to transpose it from the data processing format in which dedicated software supplies the result, such as C.S.V., into a generalized language such as HTML or in the form of a PDF document permitting the data to be rendered available to the client via his interface.

It should be noted that the consultant in charge of the site in question introduces these data into platform 200, and then has them put into form in the database 228 of the platform.

Furthermore, the platform 200 includes means at the consultant's interface 226 for inserting images and means for commenting on the data presented.

To assist the consultant in this operation the platform includes means 222 for producing from the data and commentaries present in the platform, a recap data processing document in a format enabling a user to download and/or simply to print this recap, such as the "pdf" format of the Acrobat company.

Furthermore, the platform 200 includes means (not shown) for modifying the appearance of the results, particularly in the form of tables and/or graphs, and means for selecting as key words the exact expressions (key words with quotation marks) or parts of an expression (key words without quotation marks), or a combination of the two.

Thus, this document can be transmitted via Internet and/or printed, then mailed to a client.

To comment on the data the platform comprises a system 220, called the Virtual Brain, making it possible to furnish, based on the automatic observation of the profile of the visibility results obtained by comparison between this profile and profiles recorded in a database, one or more standard comments that can serve as a base for the consultant's reflection.

Moreover, the platform includes means for modifying this commentary so as to adapt to the situation.

When the new commentary is validated by the consultant 208, the commentary is recorded with a profile of associated data, thus feeding the knowledge base called Virtual Brain.

In the preferred embodiment, the webpositioning module 206 of the platform comprises five submodules, as shown in FIG. 3:

a first "Ranking" module making it possible to select data relative to the classification of a URL for the search engines.

This "Ranking" module permits visualizing the results of the ITPN measurements as well as the different analyses written up by the consultant for the client.

The ITEN measurements are presented in the form of an impact count, one impact corresponding to the appearance of the client site in the list of responses to a request for a keyword on a search tool.

Furthermore, the results are to be organized according to several categories, viz.:

a) "Top 1" in which the hits where the site appeared first are counted,
b) "Top 10" in which the hits are counted where the site appeared among the ten first responses, and
c) "Top 20" in which the hits are counted where the site appeared among the 20 first responses.

The results of each of these categories are shown on independent pages. A commentary by the consultant 208 can be added in each case.

A second module is "Development," which permits filtering the crude data to provide data relative to the development of the rating or visibility of site according to different periods of time so as to identify the variations of visibility.

In this example, this submodule permits access to the ITPN studies of the preceding months.

A module called "Competitors" makes it possible to submit, at the client's request, ITPN studies concerning sites that compete with his site.

A module called "Guarantee" makes it possible to filter the crude data relating to a client to provide data relating to the nature of the service requested by the client.

In fact, this submodule makes it possible to submit the results of the ITPN study in relation to the results covered by one of the guarantees that may be signed by client 206 in case the latter has subscribed to this service. In fact the client 206 can see whether the results covered by the guarantee have been achieved.

A module called "Help" which makes it possible to furnish reports relating to the use of the platform 201 so as to understand its operation.

The platform furthermore provides means for printing the pages that are in consultation, provide an aid or an index of the principal technical terms employed, as well as access to the PDF documents produced, available for consultation or for downloading.

FIG. 4 represents an example of presentation of a ranking in the category "Top 1" included in the "web positioning" module of the client interface.

In this example, this page includes a menu permitting navigation in different modules and submodules of the platform.

Furthermore, the page contains a table showing the results of the ITPN measurements, viz., the name of the search tool, the appearance class of the client site in the responses and the key word looked for.

Since this page is an example of the presentation of the "Top 1" category, the appearance ranking of the hits in this list is therefore, of course, the first.

A platform according to the invention permits the results of the visibility measurement to be offered in different forms.

There is a noteworthy provision for a presentation organized by key words as well as according to the list of the pages of the client site, which are indexed in the search tools.

Furthermore, it is to be emphasized here that, generally speaking, a client cannot modify an element of the database 228 of the platform through the client interface.

In fact, as described further on, such a modification can be carried out only by an administrator equipped with a password enabling his identity to be checked.

Module HCI 210:

The module HCI 210 is dedicated to the practice of referencing by a specific process called HCI, which uses means for reading the content of a client's Internet sites, coded in HTML language, to translate them to XML format and record them in the databases of the search tools.

In other words, the HCI process permits referencing a site in an almost immediate way by recording this site in the database of the search tool, which represents an extremely great saving of time in comparison with a referencing method employing a "spider," as previously described.

The process of translating the Internet sites into XML language comprises the following steps:

Reading the content of the site, particularly its dynamic content

Generating URL addresses for all the pages of the site. For this purpose it should be noted that these URL's are generated for every type of page, including dynamic pages.

Association with each URL created of a title, of key words, of a description, of a detailed description and of a TAG.

Generation of an XML document grouping together all this information

Integration of an anti-SPAM filter, i.e., one intended to deceive the search tool, to adapt the XML document to the search tools.

Direct submission of all the data formatted in XML language to be read by the spider of each search tool involved, so as to permit the faithful indexation of all the data contained in the document to be published in the list of the search results.

Furthermore, it is well to recall that a TAG is a little script (or program) which is executed each time that a web page containing this tag is read, that is to say, is downloaded.

In the present case, the TAG's generated by the platform and inserted into the XML document make it possible to count accesses to the site by means of the search tool in which it is referenced.

In fact, when a netsurfer clicks on a link to the client site in the list of responses proposed by the search tool, this tool records data relating to the user and to his consultation.

The latter, who therefore acts simply as a counter which increases upon each consultation, permits him to know the number of accesses to the site produced by the referencing according to the HCI process on a given search tool.

The "HCI report" module of the client interface makes it possible to present the results of the referencing by this method. For this, this module includes submodules, "click report" and "performance" as well as means for consulting an index of the principal technical words used.

Lastly, it includes means for selecting the period—the week, for example—covered by the results presented.

This "click report" submodule makes it possible to present the client with the results of the number of accesses (or "clicks") to his site from the search tools where it was referenced by the HCI method.

These results are available under four categories, namely:

"Top 1" grouping the clicks by which the site was first referenced by the search server, i.e., the number of "clicks" obtained from the sites referenced in first position by a given key word, "Top 10" and "Top 20" respectively, grouping the clicks for which the site is referenced among the 10 first responses, and the 20 first responses, respectively, by the search server, i.e., the clicks obtained starting out from the sites referenced between the first and the tenth (twentieth, respectively) position.

and "evolution" making it possible to present the variations of the values over a chosen period of time, from a few days to several months, that is, the figures of the "click" results obtained in the preceding months.

Furthermore, HCI has a control device making it possible to see the count in a cumulative way for the interval in real time, i.e., the client can see immediately the increase in the number of visitors at each click.

Holosfind traffic 208 Module

The Holosfind traffic 208 module makes it possible to access a collection of analyses relating to consultations or visits of a site, as detailed below with the aid of FIG. 3b.

In a "visit" submodule a client can access information such as the number of visits in one day, the number of new visitors, the length of these visits.

Furthermore, the client can consult data relating to consultations of his site through a search engine.

More precisely, this client can consult the list of search engines considered, the visit number which each engine generates and the list of the key words considered.

According to another module, the client can access the pages consulted by the netsurfers and/or a recap of the typical navigation, i.e., of the successive consultation of different web pages by a netsurfer on his web site.

Lastly, the client can consult all of the pages put out, i.e., downloaded by a websurfer.

According to another submodule, a client can consult an analysis of languages in which the visits to his site were carried on, as well as the distribution, in terms of time zone, of these visits in one day.

Lastly, the client has technical information relating to the navigators and/or to the platforms used by the clients for consulting his web site, which enables him to improve or adapt his site to these navigators.

Thus, the client can assure himself of compatibility between the structure of his Internet site, and particularly his programming, and the tools of the websurfers visiting his site.

In fact, generally the module "Holosfind traffic" 208 offers tools for improving the site by knowing the needs and/or the behavior of the websurfers visiting his site.

For example, depending on the type of navigation, the webmaster of a client site can update the succession of the most frequently consulted pages so as to simplify the consultation of his site.

In FIG. 5 there is shown an example of a client page issued from the traffic module. Posted on this page are data relating to the number of pages viewed, the number of visitors over a given period of time and a previous period of time, as well as the variation between these two periods of time.

Furthermore, the consultant in charge of this site has inserted a note on commentaries concerning these figures, this note being obtained, as explained before, by means of an Assistant 230 for the analysis, called the "Virtual Brain."

The system of measurement of the Holosfind platform also includes a module called traffic live having a system for the complete identification of a visitor, in real time, making it possible, for example, to know the data relative to his host from which he makes his consultation, to know on what page he is in a site and its duration, to know the items or products which he is about to consult, to putting himself in direct contact via a system such as a chat, i.e., a window of communication in real time, in order to exchange information in text mode and send files in a different format (text, sound or video) during the chat or dialogue on line.

Traffic Live has functionalities permitting the personalization of dialog windows and the maintenance of various and varied files adapted to each part of the site.

On this account, forms, complementary reports and decision aids, as well as any kind of documentation can be programmed to achieve, thanks to this tool, a real client relationship adapted to the product or service being sought.

For example, when a websurfer wants to select a destination for travel on a site devoted to travel, the life traffic system can establish a contact aiming to help in choosing his destination or to find a particular promotion through an information message, or also to get a form to him on the customs regulations and health regulations of his destination.

Going further, the client can make a three-dimensional visit to a hotel room which he gets from the contact information, or listen to the official tune chosen for the Carnival of Rio in order to promote this destination or provide a realistic impression.

Due to this flexibility, this example might be applied to the mayor of a Parisian arrondissement who would provide birth reports ordered on line.

Technically, such an operation is possible due to the use of a tag in the site's pages.

Find Process Module 212

The "Find Process" module 212 makes it possible to follow the progress of the work performed by the consultant.

This module includes five submodules, as shown in FIG. 3c, viz.:

A first submodule, "Audit," which contains a submodule, "Info Site," allowing consultation of the data relating to the client's Internet site, and a second submodule, "Competition study," making it possible to consult referencing and positioning data relating to competitors' sites.

A second submodule, "Strategy," which makes it possible to consider the strategic orientations decided conjointly by the client and the consultant.

Thus it is possible to consult the title and the description, made by a consultant, appearing in the search engines as well as the pertinent key words to which the site tries to correspond.

A third submodule, "Engineering," contains a submodule, "optimization," making if possible to send to the client, via the platform, the optimized pages, by a consultant, and which the client must place and put on line in his server, that is to say, at the root of the branching out of his site, and at locations determined according to each case, so as to make the reference strategy operational.

This submodule keeps track of all these operations and alerts the consultant automatically to any time for going on line which the client must observe.

A second submodule, "Submission," permits putting a client site directly into the submission windows provided for this purpose by each engine, selecting the specific headings and categories in which the information is to be submitted.

A fifth submodule, "Planning," to permit following the progress of operations relating to the client, as part of temporary planning.

A final submodule, "Help," which makes it possible to provide information concerning the use of the platform so as to understand its operation.

Furthermore, each module or submodule includes means for printing or downloading the pages being consulted, providing help or an index of the principal technical terms employed.

The Consultant Interface

The consultant interface described below in connection with FIG. 6, is composed of a first welcome page proposing different means for filtering the files according to the consultant using the interface, and means for posting a list more or less abbreviated.

It furthermore includes means for making an intuitive search into the different clients and files.

Furthermore, it includes means for selecting different types of postings, or charts, Holosfind personalized, for example, in colors to distinguish a client.

Thus a page is reached presenting the list of the files followed by the consultant according to the technologies, or modules, subscribed by the client.

The accessible technologies are, as indicated above, "Holosfind Webpositioning," "Holosfind Connect Indexing" and "Holosfind Traffic," the operation of which has already been described under the heading of the client interface.

In the preferred embodiment, "Holosfind Webpositioning," the available data are the name of the client's site, his URL, the client's login enabling him to connect to the platform, his password, the current phase of the referencing process, and an indicator of any tardiness in this phase.'

This page furthermore includes means to return to the welcome page, means for searching for a client in the database, means for learning the various times spent in the study of the different files.

It is furthermore possible to consult and/or modify the data concerning the client as well as the state of progress of the referencing process.

Moreover, in this preferred embodiment, "Holosfind Connect Indexing," the page presenting the list of the files being followed by the connected consultant includes means for controlling the referencing procedure by the "HCI" method already described.

It is well to stress here that the "Holosfind Connect Indexing" makes it possible to carry on the referencing services paid on the results, i.e., on the number of clicks for the purpose of downloading a page from the different search tools.

However, the consultant can also access a specific module, viz., "Holosfindoperator" which permits an operator to have functions restricted and adapted to his bylaws for consulting a group of client sites pertaining to him, which are treated with white marks by the referencing firm.

By means of the "HolosFindoperator" module, a new service, "FindOperator" can be added, specific to the operator, so that the latter can propose it to these client sites.

"HolosFindoperator" returns statistics on the results of each site to the operator and to his clients, and informs the operator of the statistics on the distribution of his products in his stockyard.

The "HolosFindoperator" module sets up monthly billing addressed to the operator concerning the sites handled by the referencing firm.

The Administrator Interface

The administrator interface described below in reference to FIG. 7, includes a first page of welcome permitting access to the different modules of the interface: "Holosfind Administration," "Holosfind findoperator," Holosfind connect indexing" and "Free referencing".

The module, "Administration Holosfind," makes it possible to create, modify and delete users of the platform (client, consultant, optimizer) as well as files managed by the referencer. This module also comprises means for visualizing the lists of clients, files and consultants, as well as for creating new services such as a new module.

Furthermore, the module "Administration Holosfind" includes means for writing new maps of the platform and for modifying the logins and passwords of the administrators.

The "HolosFindoperator" module permits adding a new product, "Findoperator," to consult the list of products, to add options and add a new search tool permitting express indexation.

The present invention is susceptible of many variants.

For example, a superadministrator interface can be integrated into the platform so as to permit a single user, using a password and a corresponding login, to modify the operation of the platform and/or to connect to this platform from an already existing interface, such as a client, consultant or administrator interface.

In another variant of the invention, the platform includes a "licensees" interface permitting a user to have a license to use the platform for a group of clients which are his own, for example in a manner made similar to an operator.

In a variant, the HCI module allows the control of price variations before being paid by a site to the search tool for each websurfer directed to this site through this tool.

For this, this HCI module regularly calculates an average of the price to be paid for a site to various search tools, such that, if this average tends toward the price required by the referencing company, a consultant is automatically alerted so that he may be informed of this increase.

The invention claimed is:

1. A system for referencing web sites on the Internet indexed by research tools, comprising:
    a database;
    a client interface on a server for granting a client computer associated with a client managing a referenced website access to said database via a network;
    a consultant interface on said server for granting access to a consultant computer associated with a consultant responsible for the referencing of a website to said database via said network;
    said server providing distinct data to said client computer or said consultant computer according to the interface used for accessing said database;
    a visibility module for analyzing the visibility of a website in the Internet to provide a visibility data and storing said visibility data in said database, wherein the visibility of said website is the rate of appearance or classification of said website in a list of results proposed by a search tool in response to a keyword; and
    a translating module for:
        reading the content of said website;
        generating URL addresses for all pages of said website;
        associating, for each URL address, a title, keywords, a description, a detailed description and a TAG to provide associated data;
        generating an XML document including said associated data;
        integrating an anti-spam filter to adapt said XML document to a plurality of search tools; and
        directly submitting said associated data formatted in XML language to be read by a spider of each of said plurality of search tools, thereby permitting indexation of said associated data contained in said XML document to be published in said lists of results.

2. The system of claim 1, wherein said visibility module is operable to obtain the classification of said website in said list of results proposed by indicated search tools based on furnished keywords, a list of selected search tools and a particular URL.

3. The system of claim 1, wherein said visibility module is operable to automatically present said visibility data in a dedicated data processing format to said client via said client interface or to said consultant via said consultant interface.

4. The system of claim 3, wherein said consultant interface is operable to add images and commentaries to said visibility data and wherein said client interface is operable to transmit said images and commentaries to said client.

5. The system of claim 1, wherein said consultant interface is operable to modify the presentation of said list of results and operable to select said keyword from one of the following: an exact expression or parts of said expression.

6. The system of claim 1, wherein said consultant interface is operable to present at least one of the following modules within said visibility module:
    a ranking submodule for selecting data relative to the classification of a URL in regard to a plurality of search engines;
    an evolution submodule for filtering raw data to provide data relating to the evolution of the visibility of a website according to different periods of time so as to identify variations of visibility;

a competitors submodule for submitting, at said client's request visibility studies relating to websites competing with said client's website;

a guarantee submodule for filtering said raw data relating to said client in order to provide data relating to the nature of the service requested by said client; and a help module for providing information relating to the use of the software platform in order to understand its operation.

7. The system of claim 1, further comprising a Holosfind Connect Indexing (HCI) module for referencing a website by storing said website in a database of a search tool.

8. The system of claim 7, wherein said HCI module is operable to read HTML coded content of said website of said client, translate said HTML coded content into a XML document and store said XML document in said database of said search tool.

9. The system of claim 8, wherein said HCI module is operable to generate and insert a TAG into said XML document to permit counting access to said website by said search tool.

10. The system of claim 9, wherein said HCI module is operable to display the number of accesses detected by said TAG in real time, and consulting an index of principal terms employed in accessing said website.

11. The system of claim 10, wherein said HCI module is operable to select a period of time to which said lists of results relate in terms of access.

12. The system of claim 11, further comprising a Holosfind traffic module for accessing a set of analyses relating to consultations or visits to said website, wherein said set of analyses include at least one of the following number of visits in one day, the number of new visitors, and the duration of the visits.

13. The system of claim 12, wherein said client interface module is operable to enable said client to consult a list of the search engines involved, the number of visits generated by each search engine, and the list of the key words considered.

14. The system of claim 12, wherein said client interface module is operable to enable said client to access pages consulted by Internet users or a summary of a browser or navigation type used by said Internet users on said website.

15. The system of claim 12, wherein said client interface module is operable to enable said client to analyze languages in which said visits to said website were carried on and a distribution of said visits in one day, in terms of time zone.

16. The system of claim 12, wherein said client interface module is operable to enable said client to consult technical information relating to browsers or navigators used by Internet users to visit said website, thereby enabling said client to improve or adapt said website to said browsers or navigators.

17. The system of claim 12, wherein said Holosfind traffic module is operable to an Internet user accessing said website in real time including at least one of the following identifying information: a host from which said Internet user is accessing said website, a page viewed by said Internet user, duration of said Internet user's access to said website, and items or products accessed by said Internet user, thereby enabling said client to contact said Internet user in real time to exchange information in text mode or send text, audio or video files to said Internet user.

18. The system of claim 1, further comprising a Find Process module for monitoring the progress of the work performed by said consultant in connection with a predetermined plan by said client.

19. The system of claim 18, wherein said client interface is operable to offer at least one of the following services to said client:

consultation of information concerning said client's website, and consultation of referencing and positioning information relative to competitor's website;

consultation of strategic orientations decided jointly by said client and said consultant;

consultation of title and description of said client's website made by said consultant, appearing in search tools or engines and pertinent keywords by which said client's website can be referenced;

transmission of pages optimized for said client's website by said consultant to said client; and submission to said client's website by each search tool or engine via submission windows.

20. The system of claim 19, wherein said consultant interface is operable to enable said consultant to select different types of postings or charts which can be personalized for said client.

21. The system of claim 20, wherein said consultant interface is operable to control access to a plurality of websites managed by an operator by said consultant based on same restrictions and terms imposed on said operator in accessing said plurality of websites.

22. The system of claim 21, further comprising a Holos-Findoperator module for providing statistical results on each website in said plurality of websites to said operator and a respective client of said each website, and distribution statistics of products offered on said each website to said operator.

23. The system of claim 22, further comprising a Virtual Brain system for providing one or more commentaries representing said consultant's reflection based on said visibility data, said one or more commentaries being determined by comparing said visibility data with visibility data stored in said database and associated with a commentary.

24. The system of claim 19, wherein said consultant interface is operable to enable said consultant to access all services available to said client.

25. The system of claim 19, further comprising an administrator interface for generating, modifying and eliminating users of said software platform and records kept by said consultant by an administrator.

26. The system of claim 19, wherein said server is operable to generate pages of said server accessible to said client from data stored in at least one data structure.

27. The system of claim 19, wherein said server is operable to print pages in course of consultation, to provide a help program or an index of principal technical terms employed and access to documents for downloading.

28. The system of claim 19, wherein paid server is operable to restrict access to only those services for which said client has subscribed with said consultant.

* * * * *